United States Patent [19]

Tsuboka

[11] 4,446,530

[45] May 1, 1984

[54] FAST HADAMARD TRANSFORM DEVICE

[75] Inventor: Eiichi Tsuboka, Osaka, Japan

[73] Assignee: Matsushita Electric Industrial Co., Ltd., Osaka, Japan

[21] Appl. No.: 290,311

[22] Filed: Aug. 5, 1981

[30] Foreign Application Priority Data

Aug. 14, 1980 [JP] Japan .............................. 55-111046

[51] Int. Cl.³ .......................................... G06F 15/332
[52] U.S. Cl. ..................................... 364/725; 364/727
[58] Field of Search ............................... 364/725, 727

[56] References Cited

U.S. PATENT DOCUMENTS 3,792,355 2/1974 Miyata et al. .................... 364/725 X
3,795,864 3/1974 Fullton, Jr. ......................... 364/727
3,956,619 5/1976 Mundy et al. ....................... 364/727

OTHER PUBLICATIONS

K. Shirata et al., "The Fast Walsh-Hadamard Transform and Processors by Using New Permutation Networks", Systems.Computers.Controls, vol. 11, No. 2, Apr. 1980, pp. 64-71.

Primary Examiner—Charles E. Atkinson
Attorney, Agent, or Firm—Burgess, Ryan & Wayne

[57] ABSTRACT

Devices for performing fast Hadamard transforms based upon a predetermined algorithm are provided. A buffer memory (random-access memory) with the capacity equal to the number of components of an input vector to be transformed is provided and is addressed in such a way computation of Hadamard transforms can be performed at faster speeds with a higher degree of efficiency.

3 Claims, 15 Drawing Figures

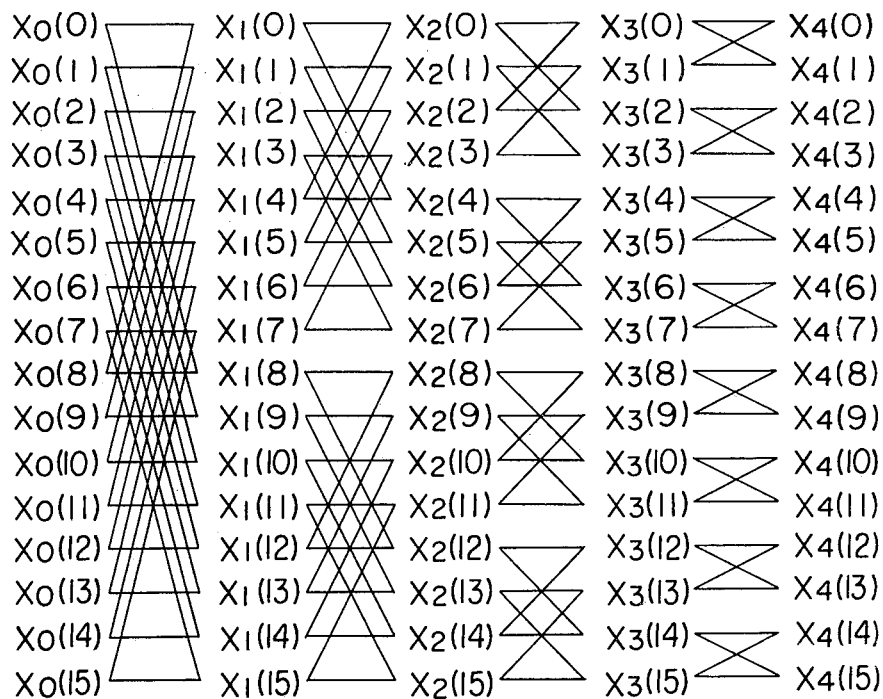

FIG. 5
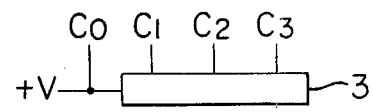
|    | $C_0$ | $C_1$ | $C_2$ | $C_3$ |
|----|---|---|---|---|
| $t_0$ | 1 | 0 | 0 | 0 |
| $t_1$ | 1 | 1 | 0 | 0 |
| $t_2$ | 1 | 1 | 1 | 0 |
| $t_3$ | 1 | 1 | 1 | 1 |
FIG. 6
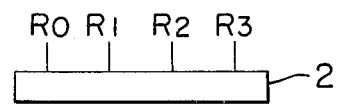
|    | $R_0$ | $R_1$ | $R_2$ | $R_3$ |
|----|---|---|---|---|
| $t_0$ | 1 | 0 | 0 | 0 |
| $t_1$ | 0 | 1 | 0 | 0 |
| $t_2$ | 0 | 0 | 1 | 0 |
| $t_3$ | 0 | 0 | 0 | 1 |
FIG. 7
| $C_0$ | $C_1$ | $C_2$ | $C_3$ | $R_0$ | $R_1$ | $R_2$ | $R_3$ | +− | $a_0$ | $a_1$ | $a_2$ | $a_3$ |
|---|---|---|---|---|---|---|---|---|---|---|---|---|
| 1 | 0 | 0 | 0 | 1 | 0 | 0 | 0 | 0 | $Q_0$ | $Q_1$ | $Q_2$ | 0 |
| 1 | 0 | 0 | 0 | 1 | 0 | 0 | 0 | 1 | $Q_0$ | $Q_1$ | $Q_2$ | 1 |
| 1 | 1 | 0 | 0 | 0 | 1 | 0 | 0 | 0 | $Q_0$ | $Q_1$ | 0 | $Q_2$ |
| 1 | 1 | 0 | 0 | 0 | 1 | 0 | 0 | 1 | $Q_0$ | $Q_1$ | 1 | $Q_2$ |
| 1 | 1 | 1 | 0 | 0 | 0 | 1 | 0 | 0 | $Q_0$ | 0 | $Q_1$ | $Q_2$ |
| 1 | 1 | 1 | 0 | 0 | 0 | 1 | 0 | 1 | $Q_0$ | 1 | $Q_1$ | $Q_2$ |
| 1 | 1 | 1 | 1 | 0 | 0 | 0 | 1 | 0 | 0 | $Q_0$ | $Q_1$ | $Q_2$ |
| 1 | 1 | 1 | 1 | 0 | 0 | 0 | 1 | 1 | 1 | $Q_0$ | $Q_1$ | $Q_2$ |

$$\begin{cases} X_K(i) = X_{K-1}(i) + X_{K-1}(j) \\ X_K(j) = X_{K-1}(i) - X_{K-1}(j) \end{cases}$$

FAST HADAMARD TRANSFORM DEVICE

BACKGROUND OF THE INVENTION

The present invention relates to a fast and economical Hadamard transform device which can be easily implemented with conventional components.

In processing analog signals such as video or acoustic signals, orthogonal transforms such as fast Fourier transform (FFT) or fast Walsh Hadamard transform (FWHT) have been widely used and various algorithms for performing such transforms have been also devised and demonstrated with satisfactory results. However, fast computation speed and economy are not compatible in practice; that is, one must be sacrificed for the other.

Speech recognition devices which need the processing of analog signals comprises, for instance, a characteristic pattern pickup stage or a stage for analyzing an input speech signal, a standard pattern storage or a class of templates, a matching or comparison stage and a decision stage. The characteristic pattern pickup stage or input-sound analyzing stage converts the sound of the input into time-serial characteristic vectors. The standard pattern storage has time-serial character vectors of the sounds to be classified. The matching or comparison stage compares the time-serially converted or transformed input sound pattern with the standard patterns to find out the similarity or calculate the distance between them. The decision stage picks up the template which has the highest similarity of the input sound or the shortest distance to the input sound thereby classifying the input sound.

In order to analyze or pick up the feature of an input sound, the so-called filter-bank method, the orthogonal transform such as FFT, the linear predictive analysis or autoregressive analysis has been widely used. The Hadamard transform can be used for the input sound analysis because it does not need high speed computation and devices for performing fast Hadamard transforms can be easily implemented in the form of LSIs.

An example of the fast Walsh Hadamard Transform of order $n=2^m$, where $m=1, 2, \ldots$, is expressed by $$X_k(i) = \begin{cases} X_{k-1}(i) + X_{k-1}(i + 2^{m-k}), & 2^{m-k+1}l \leq i \leq 2^{m-k+1}l + 2^{m-k} - 1 \\ X_{k-1}(i) - X_{k-1}(i + 2^{m-k}), & 2^{m-k+1}l + 2^{-k} \leq i \leq (l + 1)2^{m-k+1} - 1 \end{cases}$$

$i = 0, 1, 2, \ldots, n - 1$
$k = 1, 2, \ldots, m$
$l = 0, 1, 2, \ldots, 2^{k-1} - 1$ One of the features or characteristics of this algorithm resides in the fact that values of the k-th transforms $X_k(i)$ and $X_k(j)$ can be derived from the preceding transform step by the rules of $$X_k(i) = X_{k-1}(i) + X_{k-1}(j)$$

and $$X_k(j) = X_{k-1}(i) - X_{k-1}(j).$$

After the $X_k(i)$ and $X_k(j)$ have been obtained, $X_{k-1}(i)$ and $X_{k-1}(j)$ will not be used again; that is, they can be discarded. As a result, the contents in the storage location in which $X_{k-1}(i)$ or $X_{k-1}(j)$ has been stored can be modified to $X_k(i)$ or $X_k(j)$. To put into another way, one storage location can be used for storing either $X_{k-1}(i)$ or $X_{k-1}(j)$, or $X_k(i)$ or $X_{k-1}(j)$. It follows, therefore, that it suffices to provide only the number of n storage locations for performing Walsh Hadamard transforms.

Another algorithm having a similar feature is $$X_k(i) = \begin{cases} X_{k-1}(i) + X_{k-1}(i + 2^{k-1}), & 2^k l \leq i \leq 2^k l + 2^{k-1} - 1 \\ X_{k-1}(i) - X_{k-1}(i + 2^{k-1}), & 2^k l + 2^{k-1} \leq i \leq (l + 1)2^k - 1 \end{cases}$$

$i = 0, 1, 2, \ldots, n - 1$
$k = 1, 2, 3, \ldots, m$
$l = 0, 1, 2, \ldots, 2^{m-k} - 1$ One of the problems encountered in the design of devices capable of performing such algorithms as described above is that in the case of read and write cycles of respective transform steps, an efficient and accurate addressing method must be provided.

SUMMARY OF THE INVENTION

One of the objects of the present invention is to provide a fast Hadamard Transform Device which is capable of performing the Walsh Hadamard Transform at a fast speed and which can be implemented with conventional components at low cost.

Another object of the present invention is to provide a fast Hadamard Transform device which can provide a most efficient and optimum addressing method for transferring input data to be transformed or partially transformed data and reading the partially or totally transformed data into and out of a random-access memory (RAM).

A further object of the present invention is to provide a fast Hadamard Transform device in which an address in the RAM can be specified by modifying the output of a counter for specifying an address in the RAM based upon a regular change in bit pattern of addresses in the execution of a Hadamard transform algorithm.

In the fast Hadamard Transform in which the i-th element $X_k(i)$ and j-th element $X_k(j)$ in the k-th transform step are obtained by reading out $X_{k-1}(i)$ and $X_{k-1}(j)$, which are the results of the (k−1)-th transform step and are stored in a RAM; performing the following operations:

$$X_k(i) = X_{k-1}(i) + X_{k-1}(j)$$

and $$X_k(j) = X_{k-1}(i) - X_{k-1}(j)$$

and transferring the results into the storage locations in the RAM in which $X_{k-1}(i)$ and $X_{k-1}(j)$ have been stored, respectively, the present invention is based on the observed fact that a bit in a specified bit position in an address in a RAM in each transform step remains in a predetermined logical state S (0 or 1) or $\bar{S}$ corresponding to the addition of $X_{k-1}(i)+X_{k-1}(j)$ or the subtraction of $X_{k-1}(i)-X_{k-1}(j)$ while the pattern of bits in the remaining bit positions change. Therefore, a fast Hadamard Transform device in accordance with the present invention is provided with an addressing means for specifying the addresses in a RAM from and into which are read out or transferred the partially transformed results. The addressing means comprises a binary counter with at least $(m-1)$ bits and a means which, when the results of the k-th transform step from those of the preceding or $(k-1)$-th step, holds the bit in the specified bit position of an address in the logical state S in the case of reading out of $X_{k-1}(i)$ or writing of $X_k(i)$ or in the logical state $\bar{S}$ in the case of reading out of $X_{k-1}(j)$ or writing of $X_k(j)$ while holding the bits in the remaining bit positions in a pattern corresponding to the bit pattern in the binary counter.

BRIEF DESCRIPTION OF THE DRAWINGS

FIG. 1 shows an algorithm flow chart for performing fast Walsh-Hadamard transforms of order 16;

FIG. 2 is a table used to explain an addressing method used in the algorithm shown in FIG. 1;

FIGS. 3A–3D to 7 are views used to explain a circuit adapted to carry out the addressing method shown in FIG. 2;

DESCRIPTION OF THE PREFERRED EMBODIMENTS

Figure 12:
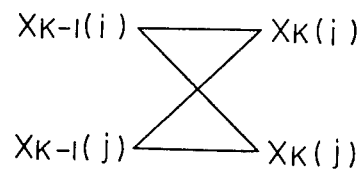
FIG. 12 is a view used to explain the notations used in FIGS. 1 and 11.

An algorithm which is performed or executed by a fast Hadamard-Transform device in accordance with the present invention will be described first. FIG. 1 shows the flowchart of a first algorithm of the present invention for performing the fast Walsh Hadamard Transform of order 16. $X_0(0) \sim X_0(15)$ indicate inputs to be transformed and $X_4(0) \sim X_4(15)$, transformed outputs. $X_k$ and $X_{k-1}$ are correlated by the rules as shown in FIG. 12. $X_k(i)$ and $X_k(j)$ denote the values of the i-th and j-th elements, respectively, in the k-th transform step. The k-th transform step can be obtained from the results of the $(k-1)$-th step by the following rules:

$$X_k(i) = X_{k-1}(i) + X_{k-1}(j)$$

and $$X_k(j) = X_{k-1}(i) - X_{k-1}(j).$$

However, the components in the transformed outputs are not arranged in the order of their sequency. Therefore, according to the present invention, in order to arrange $X_4(0) \sim X_4(15)$ in the order of their sequency, the following procedure is taken. First, i of $X_4(i)$ is converted into a binary numeral; the sequence of bits is then reversed; and the result is converted into a Grey code, whereby a new transformed value can be obtained. Assume, for instance, that $i=0011$ in binary notation. Then, the reverse of the binary sequence results in 1100, which is 8 in sequence in a Grey code.

Alternatively, prior to the transform, the sequence of inputs $X_0(0) \sim X_0(15)$ is so rearranged that the outputs $X_4(0) \sim X_4(15)$ appear in the order of their sequency. That is, an input is rearranged as follows. i of $X_0(i)$ is first expressed in binary notation and the sequence of bits is reversed. The reversed sequence is then converted into a Grey code. If the results is j, $X_0(j)$ is placed at the i-th position. Therefore, the outputs $X_4(0) \sim X_4(15)$ are obtained in the order of their sequency. For instance, $i=0011$ if $X_0(3)$. Then, j becomes 8 so that $X_0(3)$ is replaced by $X_0(8)$.

Transforms can be carried out in a manner substantially similar to that described above when the general order $n=2^m$ $(m=1, 2, \ldots)$. That is, $$X_k(i) = \begin{cases} X_{k-1}(i) + X_{k-1}(i + 2^{m-k}), & 2^{m-k+1}l \leq i \leq 2^{m-k+1}l + 2^{m-k} - 1 \\ X_{k-1}(i) - X_{k-1}(i + 2^{m-k}), & 2^{m-k+1}l + 2^{-k} \leq i \leq (l+1)2^{m-k+1} - 1 \end{cases}$$

$$i = 0, 1, 2, \ldots, n - 1$$
$$k = 1, 2, \ldots, m$$
$$l = 0, 1, 2, \ldots, 2^{k-1} - 1$$

As is clear from FIG. 1, one of the features of this algorithm resides in the fact that the k-th transforms $X_k(i)$ and $X_k(j)$ can be derived from the $(k-1)$-th transforms $X_{k-1}(i)$ and $X_{k-1}(j)$ and thereafter $X_{k-1}(i)$ and $X_{k-1}(j)$ will not be used again so that $X_k(i)$ can be stored in a location in which $X_{k-1}(i)$ has been stored. That is, the contents that is, $X_{k-1}(i)$ in a specific storage location can be modified to $X_k(i)$. As a result, it suffices only to provide a number of n storage locations for executing Walsh Hadamard transforms of order n.

A second algorithm having the features similar to those described above is shown in FIG. 11. That is, $$X_k(i) = $$

$$\begin{cases} X_{k-1}(i) + X_{k-1}(i + 2^{k-1}), & 2^k l \leq i \leq 2^k l + 2^{k-1} - 1 \\ X_{k-1}(i) - X_{k-1}(i + 2^{k-1}), & 2^k l + 2^{k-1} \leq i \leq (l+1)2^k - 1 \end{cases}$$

$$i = 0, 1, 2, \ldots, n - 1$$
$$k = 1, 2, 3, \ldots, m$$
$$l = 0, 1, 2, \ldots, 2^{m-k} - 1$$

One of the problems encountered when devices capable of executing such algorithms as described above is how to appropriately store and read out data being transformed in each transform step by specifying storing locations; that is, the addresses in a RAM.

The address modification in the execution of the first algorithm as shown in FIG. 1 will be described with reference to FIG. 2. "$a_3a_2a_1a_0$" indicates in binary notation an address in a RAM. A positive address refers to the address of i while a negative address refers to the address of j when $X_k(i)$ and $X_k(j)$ are obtained by the following rules as described previously:

$$X_k(i) = X_{k-1}(i) + X_{k-1}(j)$$

and $$X_k(j) = X_{k-1}(i) - X_{k-1}(j).$$

The addresses are arranged in the ascending order of i and j.

In the case of transform from $X_{k-1}$ to $X_k$, the bits $a_{4-k}$ in the positive addresses are always "0"s while those in the negative addresses are always "1"s as indicated by blocks of dotted lines in FIG. 2. The remaining three bits change from 000 to 111 in binary notation. Same is true for the general order $n = 2^m$. In the latter case, i is expressed by $a_{k-1}a_{k-2} \ldots a_1a_0$. Therefore, in the case of transform from $X_{k-1}$ to $X_k$, the bits $a_{m-k}$ are always "0"s in the positive addresses and "1"s in the negative addresses. The remaining (m−1) bits change in binary notation.

Figure 3A:
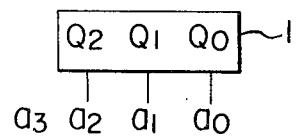
Figure 3B:
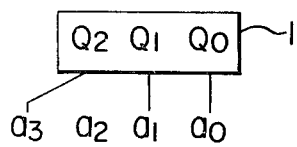
Figure 3C:
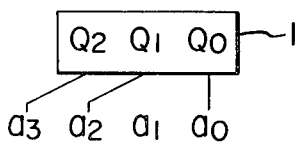
Figure 3D:
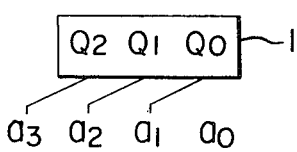

The underlying principle of the address specification or modification in accordance with the present invention will be described with reference to FIG. 3 when the order n=16. The contents in respective stages of a binary counter 1 are $Q_2$, $Q_1$ and $Q_0$, respectively. $Q_i$ represents the contents in a $2^i$-th digit position. FIGS. 3A, 3B, 3C and 3D show the address specification or modification steps, respectively, when $X_0$ is transformed to $X_1$; $X_1$, to $X_2$; $X_2$, to $X_3$; and $X_3$, to $X_4$. In the case of positive addresses, $a_3$ in FIG. 3A, $a_2$ in FIG. 3B, $a_1$ in FIG. 3C and $a_0$ in FIG. 3D are all "0"s, but in the case of negative addresses, they are all "1"s. The binary counter 1 is of the conventional type and so designed and constructed that the output can be derived according to the rules described previously. The binary counter 1 can be implemented with gate circuits in a simple manner as will be described in detail below.

Figure 4:
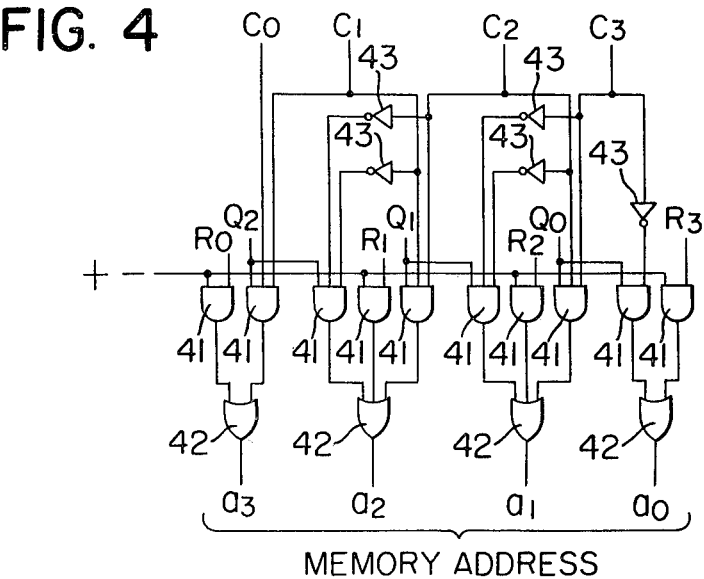

Referring to FIG. 4, reference numerals 41 denote AND gates; 42, OR gates; 43, inverters; $C_0 \sim C_3$, the outputs from respective stage of a C register 3; and $R_0 \sim R_3$, those from respective stages of a R register 2. FIGS. 5 and 6 show the change in contents in respective stages of these registers with time. The contents change from the initial contents at $t_0$ as shown at $t_1$ to $t_3$ as clock pulses are applied to the registers. FIG. 7 shows the truth table of the circuit shown in FIG. 4.

Figure 10:
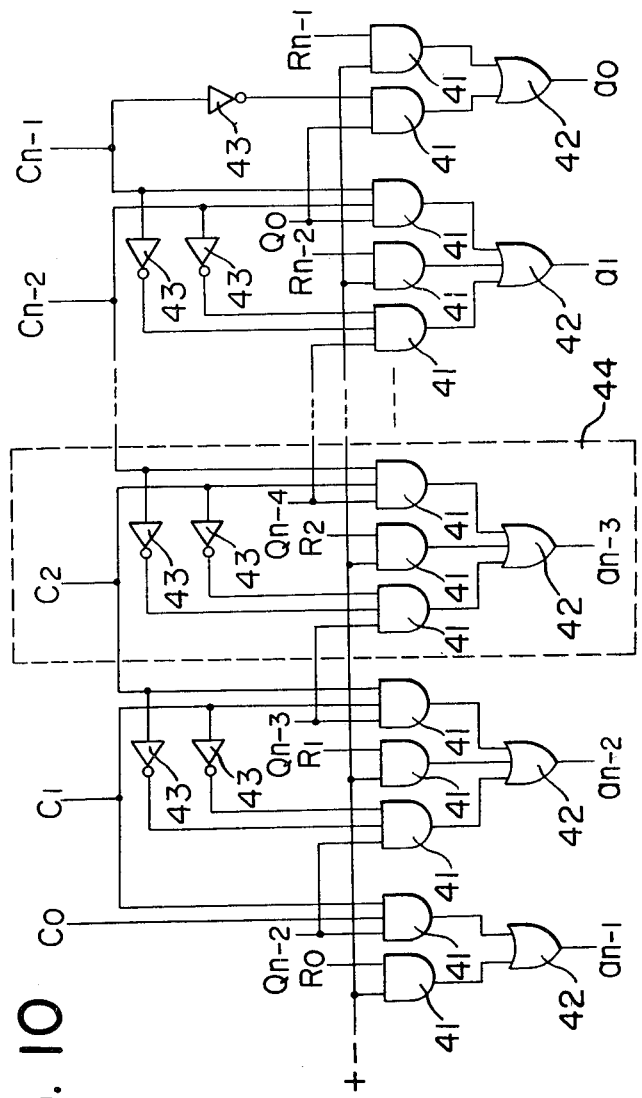
FIG. 10 shows an address-specification circuit used in performing fast Hadamard transforms of order $2^m$.

When $n = 2^m$, a circuit as shown in FIG. 10 can be used. Depending upon n, blocks 44 indicated by broken lines are increased or decreased in number. The C and R registers have (m−1) and m bits, respectively and the counter 1 has (m−1) bits.

Figure 8:
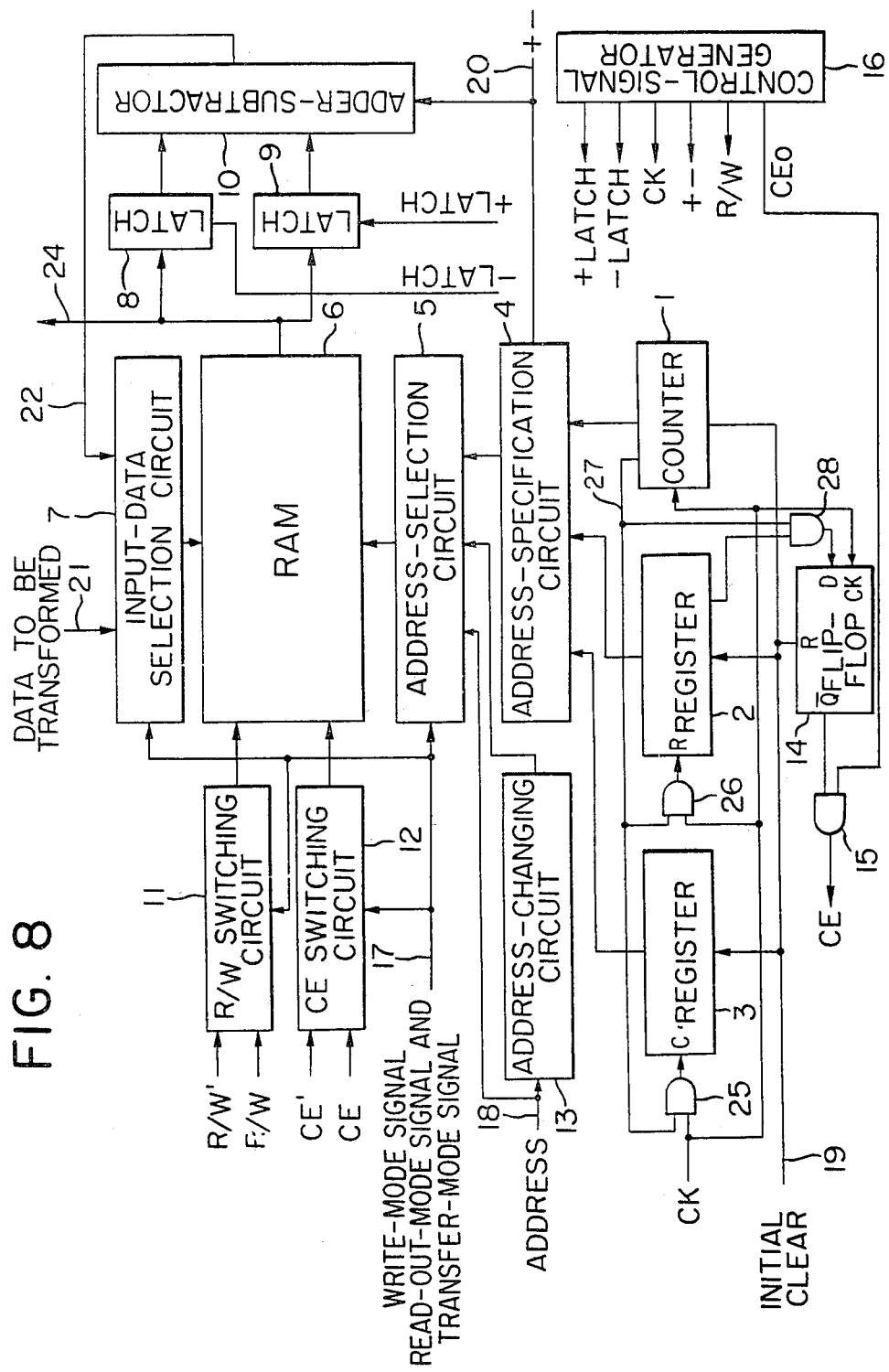
FIG. 8 is a block diagram of a first embodiment of the present invention.

One embodiment of a fast Hadamard transform device in accordance with the present invention will be described in detail with reference to FIG. 8. In general, the device executes four steps; that is, the first step (1) for reading in data to be transformed; the second step (2) for clearing registers, counters, flip-flops and so on; the third step (3) for excecuting Hadamard transforms; and the fourth step (4) for reading out transformed data from a RAM in response to a control signal generated externally. Of these steps, the circuit shown in FIG. 8 can automatically execute the step (3). Reference numerals 1, 2 and 3 denotes the counter and R and C registers, respectively, described previously; 4, an address-specification circuit of the type described previously with reference to FIG. 4 or 10; 5, an address-selection circuit responsive not only the output from the address-specification circuit 4 but also other external signals to select an address as will be described in detail below; and 6, a RAM for reading in data to be transformed and temporarily storing data being transformed. Depending upon the read-in mode for reading in data to be transformed, the read-out mode for reading out the transformed data or the transform mode, the output from the address-selection circuit 5 specifies predetermined addresses in RAM. An input-data selection circuit 7 is switched between the first mode for transferring data to be transformed into RAM and the second mode for transferring data being transformed into RAM. A first latch 8 temporarily holds $X_{k-1}(i)$ while a second latch 9, $X_{k-1}(j)$. In response to a (+ −) signal, an adder-subtractor 10 reads out the contents in the first and second latches 8 and 9 and executes $$X_{k-1}(i) + X_{k-1}(j)$$

or $$X_{k-1}(i) - X_{k-1}(j).$$

A read-write circuit (R/W switching circuit) 11 selects an externally applied R/W' or R/W signal depending upon a selected mode as will be described in detail below. R/W signal is automatically generated during the transform mode. Chip enable selection or switching circuit 12 selects between CE' signal which is applied as a chip-enable signal to RAM when data is read in or out therefrom and CE signal which is automatically generated in the transform mode as will be described in detail below. An address-changing circuit 13 changes addresses to be specified in RAM so that the contents in RAM can be read out in the order of their sequency according to the rules described previously after the execution of transforms. If addresses can be specified in the order of sequency, the circuit 13 can be eliminated. A flip-flop 14 generates a gate signal to be applied to an AND gate 15. During the transform mode, chip-enable signals are applied through the AND gate 15 and the CE selection or switching circuit 12 to RAM 6. A control-signal generator 16 generates various control signals for controlling the device shown in FIG. 8.

Next, the mode of operation of the first embodiment with the above-described construction will be described.

(I) Mode or Cycle for Writing Data to be Transformed into RAM

The write-mode signal appears at the terminal 17 so that the input-data selection circuit 7 selects the terminal 21 while the R/W switching circuit 11 selects R/W'. CE switching circuit 12 selects CE' and the address-selection circuit 5 selects the terminal 18. Thus, the data to be transformed are transferred into RAM 6.

(II) Transform Mode or Cycle

Figure 9:
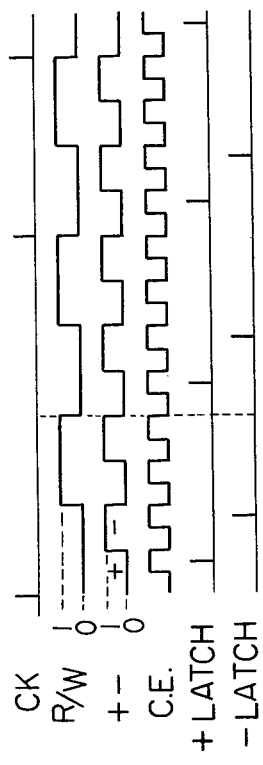
FIG. 9 is a timing chart used to explain the mode of operation thereof.

The transform-mode signal appears at the terminal 17. Then, the input-data selection circuit 7 selects the terminal or data-in line 22. R/W switching circuit 11 selects the signal R/W and CE switching circuit 12, the signal CE. The address-selection circuit 5 receives the output from the address-specification circuit 4. In response to the clear signal which appears at the terminal 19, the counter 1, the registers 2 and 3 and the flip-flop 14 are cleared. Thus, transforms are performed in response to clock pulses CK and other control pulses as shown in FIG. 9. Each time when the contents in the counter 1 are incremented by one, the registers 2 and 3 change their states in response to a clock pulse CK which is gated through AND gates 25 and 26, respectively, in response to a carrier signal 27 from the counter 1.

The output from AND gate 28, to which are applied the carrier signal 27 from the counter 1 and the output from the last stage of the register 2, is applied to the D terminal of the flip-flop 14. At the first half cycle of the clock pulse, $X_{k-1}(i)$ and $X_{k-1}(j)$ are read out of RAM 6 and at the second half cycle the $X_k(i)$ and $X_k(j)$ which are derived according to the algorithm as shown in FIG. 12 are transferred into RAM 6. Referring to FIG. 9, when R/W goes low or becomes 0, the data are read out and when R/W goes high or becomes 1, the data are transferred into RAM 6. When the counter 1 and the registers 2 and 3 remain in the same states, respectively, in the read-out mode, the signal (+ −) switches the addresses in RAM 6 at which are stored $X_{k-1}(i)$ and $X_{k-1}(j)$, but in the write mode, it switches the addresses into which are transferred $X_k(i)$ and $X_k(j)$. More specifically, when (+ −) signal goes low or becomes 0, $X_{k-1}(i)$ is read out or $X_k(i)$ is transferred into a storage location. On the other hand, when (+ −) signal goes high or becomes 1, $X_{k-1}(j)$ is read out or $X_{k-1}(j)$ is transferred into a specified cell in RAM 6. In practice, the read-out or write operation is executed in response to CE=1.

In response to the + latch signal, $X_{k-1}(i)$ and − latch signal $X_{k-1}(j)$ are transferred to and held in the latching circuits 8 and 9, respectively. When the (+ −) signal goes low or becomes 0, the adder-subtractor 10 functions as an adder, but when the (+ −) signal goes high or becomes 1, it functions as a subtractor. While R/W is 1 or high and (+ −) signal is 0 or low, $X_k(i)=X_{k-1}(i)+X_{k-1}(j)$ is transferred into the cell in which $X_{k-1}(i)$ has been stored. When the (+ −) signal becomes 1 or goes high, $X_k(j)=X_{k-1}(i)-X_{k-1}(j)$ is transferred into the cell in which $X_{k-1}(j)$ has been stored.

As transforms proceed in the manner described above, the contents in the last stage in the R register 2 becomes "1" so that the output of the flip-flop 14 becomes "0". As a result, the CE pulse is not derived from AND gate 15 so that the operation of RAM 6 is terminated until the next initial clear pulse appears at the terminal 19.

(III) Mode for Reading out Transformed Data from RAM 6

The read-out mode signal appears at the terminal 17 so that the R/W switching circuit 11 selects the signal R/W' and the CE switching circuit 12, the signal CE'. The address-selection circuit 5 receives the address signal which appears at the terminal 18 or the address signal which is obtained by modifying or changing the address appearing on the line 18 through the address changing circuit 13. More specifically, if the address signals which appear at the terminal 18 are such that the contents in RAM 6 can be read out in the order of sequency the address-selection circuit 5 receives the address signals which appear at the terminal 18. However, when the address signals which appear at the terminal 18 are in binary notation, they are transferred into the address changing circuit 13 so that they are changed, whereby the data in the RAM 6 can be read out in the order of their sequency. The output of the address changing circuit 13 is then applied to the address-selection circuit 5. Thus, the transformed data are transferred onto a data-out line 24.

Figure 11:
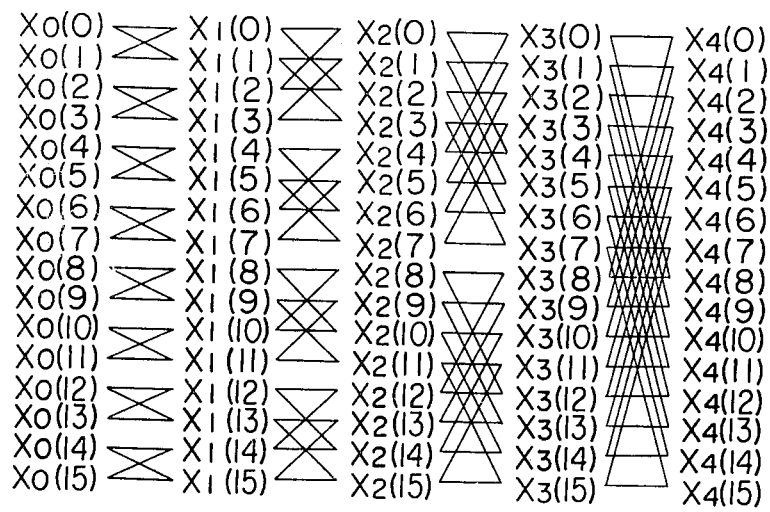
FIG. 11 shows the flowchart of an algorithm for performing fast Walsh Hadamard transforms of order 16.

In the case of a transform according to the second algorithm as shown in FIG. 11 and in the execution of instructions as shown in FIG. 12, the $2^{k-1}$-th digit is always logical "0" in the positive address, but is logical "1" in the negative address. In this case, the R and C registers 2 and 3 are so designed and constructed that their states or contents change in reverse sequence to the first embodiment described above.

The $2^{m-k}$-th digit in the first embodiment or the $2^{k-1}$-th digit in the second embodiment becomes logical "0" in the case of reading of $X_{k-1}(i)$ or writing of $X_k(i)$, but becomes logical "0" in the case of reading of $X_{k-1}(j)$ or writing of $X_k(j)$. However, it can be reversed. That is, it can become logical "1" in the case of reading $X_{k-1}(i)$ or writing of $X_k(i)$, but can become logical "0" in the case of reading $X_{k-1}(j)$ or writing of $X_k(j)$. The essential feature of the present invention remains unchanged even through the addresses in the RAM 6 in which these data are stored change.

In summary, according to the fast Hadamard transform device of the present invention, when input data to be transformed and the signal for initiating transforms are received, Hadamard transforms can be performed at high speed. In addition, the device can be easily implemented with conventional IC elements so that it can be fabricated at low cost.

What is claimed is:

1. In a fast Hadamard transform of order $2^m$, where m=1, 2, ... in which $X_k(i)=X_{k-1}(i)+X_{k-1}(j)$ and $X_k(j)=X_{k-1}(i)-X_{k-1}(j)$, where i and j=0, 1, ..., $2^m-1$ and $X_k(i)$ and $X_k(j)$ are i-th and j-th elements in the k-th transform step, a fast Hadamard transform device having an addressing means for reading intermediate transformed values into or out of a random-access memory, said device comprising:

(a) a binary counter with at least (m−1) bits;
   (b) a register means for specifying the current transform step and a predetermined bit position of an address in said random access memory for the transform step; and
   (c) an address specification means which, in the case of deriving the values of the k-th transform step from the results of the (k−1)-th transform step, holds a bit at said specified predetermined bit position of an address in said random-access memory in the logical state S (1 or 0) in the case of reading out of $X_k(i)$ but holds in the logical state $\overline{S}$, the negation of the logical state S, in the case of reading out of $X_{k-1}(j)$ or writing of $X_k(j)$ and which holds the bits at the remaining bit positions in the same pattern as that of the contents in said binary counter.

2. A fast Hadamard transform device as set forth in claim 1 wherein said address specification means holds the bits in the $2^0$-th to $2^{m-k-1}$-th bit positions of an address in said random-access memory in one-to-one correspondence relationships, respectively, with the bits in the $2^{m-k+1}$-th to $2^m$-th positions in said binary counter; and holds the bits in the $2^{m-k+1}$-th to $2^m$-th bit positions of said address in one-to-one correspondence relationships, respectively with the bits in the $2^{m-k}$-th to $2^{m-1}$-th bit positions in said binary counter; and holds the bit in the $2^{m-k}$-th bit position of said address in the logical state S in the case of reading out of $X_{k-1}(i)$ or writing of $X_k(i)$ or in the logical state $\overline{S}$ in the case of reading out $X_{k-1}(j)$ or writing of $X_k(j)$.

3. A fast Hadamard transform device as set forth in claim 1 wherein said address specification means holds the bits in the $2^0$-th to $2^{k-2}$-th bit positions of an address in said random-access memory in one-to-one correspondence relationships, respectively, with the bits in the $2^0$-th to $2^{k-2}$-th bit positions of said binary counter; holds the bits in the $2^k$-th to $2^m$-th bit positions of said address in one-to-one correspondence relationships, respectively, with the bits in the $2^{k-1}$-th to $2^{m-1}$-th bit positions of said binary counter; and holds the bit in the $2^{k-1}$-th bit position of said address in the logical state S in the case of reading out of $X_{k-1}(i)$ or writing of $X_k(i)$ or in the logical state $\overline{S}$ in the case of reading out of $X_{k-1}(j)$ or writing of $X_k(j)$.

* * * * *